United States Patent [19]

Hitachi et al.

[11] Patent Number: 5,094,821
[45] Date of Patent: Mar. 10, 1992

[54] EXHAUST GAS CLEANING DEVICE

[75] Inventors: Yuzo Hitachi; Haruo Serizawa, both of Shizuoka, Japan

[73] Assignee: Usui Kokusai Sangyo Kabushiki Kaisha, Japan

[21] Appl. No.: 481,156

[22] Filed: Feb. 20, 1990

[30] Foreign Application Priority Data

Feb. 21, 1989 [JP] Japan .................... 1-18466[U]

[51] Int. Cl.⁵ .............................................. F01N 3/15
[52] U.S. Cl. .................................. 422/180; 422/168; 422/177; 60/299; 60/301
[58] Field of Search .............. 422/184, 177, 168; 60/299, 301

[56] References Cited

U.S. PATENT DOCUMENTS

| | | | |
|---|---|---|---|
| 3,969,082 | 7/1976 | Cairns et al. | 422/180 |
| 4,186,172 | 1/1980 | Scholz | 60/299 X |
| 4,300,956 | 11/1981 | Rosenberger et al. | 422/180 X |
| 4,665,051 | 5/1987 | Nonnenmann | 422/180 X |
| 4,719,680 | 1/1988 | Cyron | 422/180 X |
| 4,755,360 | 7/1988 | Dickey et al. | 422/177 X |
| 4,795,615 | 1/1989 | Cyron et al. | 422/180 X |
| 4,909,994 | 3/1990 | Nishizawa et al. | 422/180 |

FOREIGN PATENT DOCUMENTS 2063092 6/1981 United Kingdom .............. 422/180

*Primary Examiner*—Robert J. Warden
*Assistant Examiner*—Lynn M. Kummert
*Attorney, Agent, or Firm*—Lowe, Price, LeBlanc & Becker

[57] ABSTRACT

An exhaust gas cleaning device for a motor vehicle is constructed of a metal casing open at both ends thereof and a honeycomb core body fixedly enclosed within the metal casing. The honeycomb core body has been formed by superposing a planar band made of a metal sheet and a corrugated band made from another metal sheet one over the other in a contiguous relationship. The honeycomb core body defines a number of network-patterned axial gas flow passages and is adapted to carry an exhaust gas cleaning catalyst. At least one fin is fixed on an outer peripheral wall of the metal casing.

9 Claims, 3 Drawing Sheets

EXHAUST GAS CLEANING DEVICE

BACKGROUND OF THE INVENTION

1. Field of the Invention

The present invention relates to an exhaust gas cleaning device constructed of a cylindrical metal casing and a metal-made honeycomb core body for carrying an exhaust gas cleaning catalyst. As a cleaning means for exhaust gas from a motor vehicle, the exhaust gas cleaning device is generally installed at an intermediate point of an exhaust pipe.

More specifically, this invention is concerned with an exhaust gas cleaning device of the above sort, which is employed under severe conditions. The exhaust gas cleaning device features the use of a metal casing with improved resistance to deformations and breakage by thermal expansion and stresses.

2. Description of the Related Art

Exhaust gas cleaning devices of the above sort have conventionally been fabricated in the following manner. Namely, a planar band made of a heat-resistant steel sheet and a corrugated band obtained by forming a similar steel sheet into a wavy or sinuous form are superposed one over the other in a contiguous relationship. They are rolled into a multi-layered spiral form, thereby forming a honeycomb-shaped multi-layered composite body axially defining a number of network-patterned gas flow passages for allowing exhaust gas to flow therethrough. Needless to say, the planar band and corrugated band can be superposed as layers one over the other in a contiguous relationship, thereby forming a honeycomb-shaped multi-layered composite body axially defining a number of network-patterned gas flow passages through which exhaust gas is allowed to flow. These honeycomb-shaped multi-layered composite bodies will hereinafter be called "honeycomb core bodies".

A honeycomb core body formed as described above is then inserted into a cylindrical metal casing which is open at both ends thereof. The honeycomb core body and metal casing are thereafter firmly joined together by brazing or soldering, so that they can withstand thermal stresses and deformations due to the high temperature of exhaust gas, exothermic reactions between exhaust gas and the catalyst and the like and further vibrations while the associated motor vehicle is running. Needless to say, the planar and corrugated bands which make up the honeycomb core body are firmly joined together at contacts therebetween by any one of various suitable methods, for example, by welding or brazing.

In an exhaust gas cleaning device constructed of a honeycomb core body of the above sort and a cylindrical casing, an outer peripheral surface of the metal casing is exposed to the outside air so that heat of the honeycomb core body is radiated from the outer peripheral surface of the metal casing. A considerable temperature difference therefore occurs between the outer peripheral wall of the metal casing and the internal honeycomb core body. The flow velocity of exhaust gas is faster through an axially central portion. Accordingly, the temperature of the axially central portion becomes higher than that of a peripheral core portion due to reactions of exhaust gas, which reactions are induced by a catalyst carried on the honeycomb core body. As a result, thermal stresses from the honeycomb core body are concentrated on an outer peripheral wall of the metal casing. Namely, deformation forces and strains which are caused by thermal expansion and thermal stresses which occur in and/or between members (i.e., planar band and corrugated band) making up the honeycomb core body are concentrated on the outer peripheral wall of the metal casing. This may lead to cracking and breakage of the outer peripheral wall of the metal casing and therefore is very dangerous. Moreover, this may result in a reduction to the service life of the exhaust cleaning device.

OBJECTS AND SUMMARY OF THE INVENTION

The present inventors have conducted various investigations with a view toward improving the rigidity of an outer peripheral wall of a metal casing employed in an exhaust gas cleaning device. As a result, fixing of one or more fins on an outer peripheral wall of the metal casing has been found extremely effective.

An object of the present invention is therefore to furnish an exhaust gas cleaning device which structurally features the use of a metal casing, which has an outer peripheral wall having improved rigidity as a metal casing for enclosing a metal-made honeycomb core body in a form fixed to the metal casing and which assures safety during long-term use.

In one aspect of the present invention, there is thus provided an exhaust gas cleaning device constructed of a metal casing open at both ends thereof and a honeycomb core body fixedly enclosed within the metal casing. The honeycomb core body has been formed by superposing a planar band made of a metal sheet and a corrugated band made from another metal sheet one over the other in a contiguous relationship and defines a number of network-patterned axial gas flow passages. The honeycomb core body is adapted to carry an exhaust gas cleaning catalyst. At least one fin is fixed on an outer peripheral wall of the metal casing.

In an exhaust gas cleaning device of the above-described sort, the internal honeycomb core body is exposed to severe thermal use conditions whereas the metal casing is exposed to the outer air. Deformation forces and strains which are induced by thermal expansion and thermal stresses which occur in and between constituent members (namely, planar band and corrugated band) of the honeycomb core body are concentrated on an outer peripheral wall of the metal casing and its adjacent portion, so that the outer peripheral wall and its adjacent portion are subjected to intensive deformation forces and strains. This may therefore lead to cracking and breakage of the metal casing.

Owing to the fixing of at least one fin on the outer peripheral wall of the metal casing in the exhaust gas cleaning device according to the present invention, the rigidity of the outer peripheral wall has been enhanced significantly, so that the metal casing, namely, the exhaust gas cleaning device can successfully withstand long-term use.

It is possible to use the finned metal casing according to the present invention after inserting the same in a separately-fabricated metal casing and then fixedly uniting them together. In this arrangement, a spacing is formed between the finned metal casing and the separately-fabricated metal casing, thereby bringing about a further advantage that the noise of exhaust gas flowing through the honeycomb core body can be effectively reduced or deadened.

In addition, owing to the fixed provision of at least one fin on the outer peripheral wall of the metal casing, the radiation of heat has been improved. The fin is therefore effective for radiating a great deal of heat which may be generated inside the honeycomb core body due to certain abnormal reactions of exhaust gas induced by an associated catalyst. The exhaust gas cleaning device according to the present invention is therefore excellent in many aspects such as safety, the stabilization of catalytic reactions and the long-term retention of high cleaning performance.

BRIEF DESCRIPTION OF THE DRAWINGS

The above and other objects, features and advantages of the present invention will become apparent from the following description and the appended claims, taken in conjunction with the accompanying claims, in which:

DETAILED DESCRIPTION OF THE INVENTION AND PREFERRED EMBODIMENTS

As has been described above, the present invention is directed to an exhaust gas cleaning device constructed of a metal-made honeycomb core body, which is adapted to carry an exhaust gas cleaning catalyst (such as Pt, Pd or Rh) thereon, and a cylindrical metal casing. The principal feature of the present invention resides in the use of a metal casing, which has at least one fin fixed on an outer peripheral wall thereof, as the cylindrical metal casing.

In the present invention, the metal-made honeycomb core body itself has a structure such as that shown in FIGS. 1-5 or FIG. 6. It can be fabricated by a conventional method.

Figure 5:
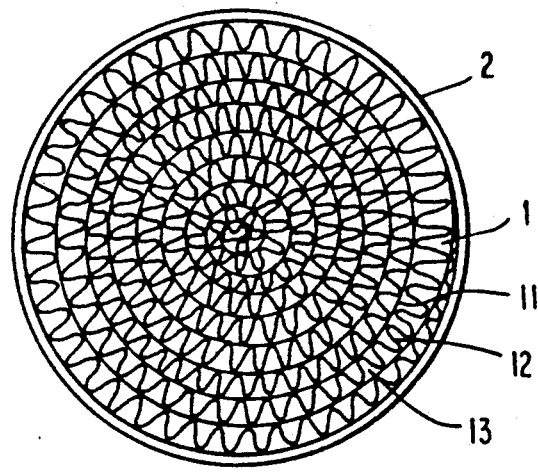
FIG. 5 is an end view of an exhaust gas cleaning device, in which a honeycomb core body formed by rolling a planar band and a corrugated band into a multi-layered spiral form is fixed in a metal casing having a circular transverse cross-section.
Figure 6:
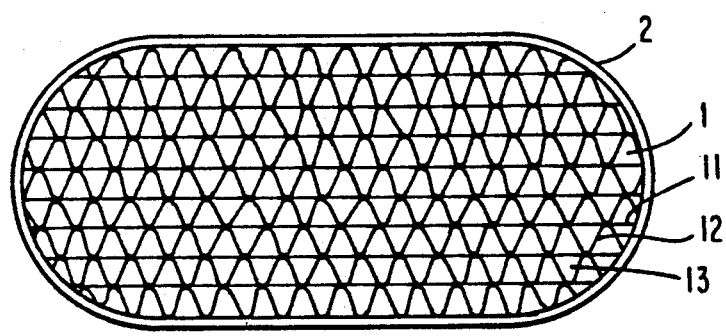
FIG. 6 is an end view of an exhaust gas cleaning device, in which a honeycomb core body formed by alternately superposing planar bands and corrugated bands into a multi-layered form is fixed in a metal casing having an oval transverse cross-section.

Described specifically, a honeycomb core body 1 can be fabricated as shown in FIG. 5, namely, by superposing in a contiguous relationship a planar band 11 made of a heat-resistant thin steel sheet having a thickness of about 0.03-0.1 mm and a corrugated band 12 obtained by forming a similar steel sheet into a wavy or sinuous shape and then rolling the thus-superposed bands into a multi-layered spiral form with at least one outermost layer thereof being formed of the planar band 11. Because of this rolling, a number of network-patterned axial gas flow passages 13, which will serve as flow passages for exhaust gas, have been formed automatically. As an alternative, as shown in FIG. 6, it can also be constructed by alternately superposing planar bands 11 and corrugated bands 12 in a contiguous relationship so that a multi-layered composite body is formed.

As each planar band 11, a steel sheet having a thickness of 0.04 mm and a width of 75 mm, such as a heat-resistant Fe-Cr20%-Al5% stainless steel or a heat-resistant stainless steel obtained by adding one or more rare earth metals to the former stainless steel to improve the oxidation resistance can be used by way of example. As each corrugated band 12 on the other hand, it is possible to use a similar planar band after forming it into a wavy or sinuous shape. It is preferred to use an Al-containing stainless steel for each band, because $Al_2O_3$ is formed in the form of whiskers on the surfaces of the band by heat treatment and these whiskers can firmly hold an exhaust gas cleaning catalyst.

As the metal casing 2 for enclosing and holding the above honecomb core body 1 therein, no particular limitation is imposed on its configurations as long as it is open at both ends. FIG. 5 and FIG. 6 illustrate a metal casing having a circular transverse cross-section and another metal casing having a racetrack-like or oval transverse cross-section, respectively. It is to be noted that they are given by way of example only and not by way of limitation of the invention. To conform with an installation space in a lower part of a motor vehicle, an exhaust gas cleaning device may be constructed, for example, by using a metal casing having a substantially triangular transverse cross-section. As the material of the metal casing, heat-resistant steel of the same kind as the planar and corrugated bands may be used. A material having high heat and corrosion resistance may also be used. It is also possible to use a multi-layered, for example, a double-layered sheet in which the metal material forming the outer layer has higher heat and corrosion resistance than that making up the inner layer. Described specifically, it is possible to use a clad steel sheet made of a ferritic stainless steel as a core and an austenitic stainless steel as a clad.

A description will next be made of the structure of one or more fins provided to improve the rigidity of the outer wall of the metal casing 2.

In the present invention, no particular limitation is imposed on the shape, number and fixing method of one or more fins fixed on the outer peripheral wall of the metal casing 2. Examples of the fin or fins may include those illustrated in FIGS. 1-4 respectively.

Figure 1:
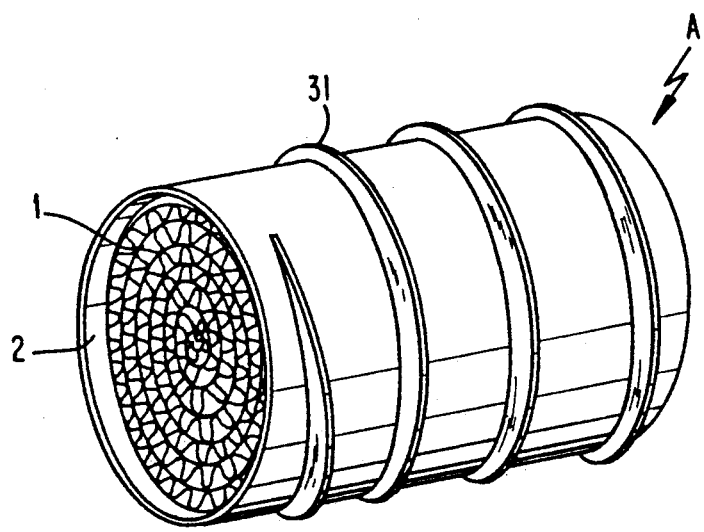
FIG. 1 is a perspective view of an exhaust gas cleaning device according to a first embodiment of the present invention, in which a finned metal casing is used.

(i) In FIG. 1 showing the first embodiment of the present invention, a spiral fin 31 is fixed on the outer peripheral wall of the metal casing 1.

Figure 2:
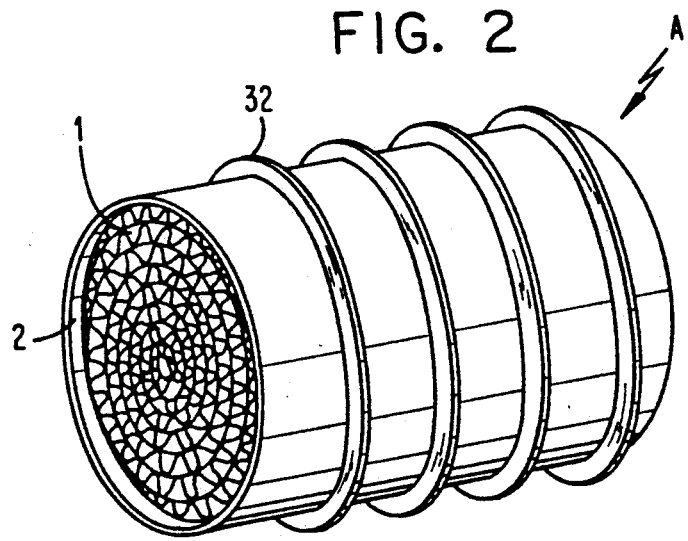
FIG. 2 is a perspective view of an exhaust gas cleaning device according to a second embodiment of the present invention, in which another finned metal casing is used.

(ii) in FIG. 2 depicting the second embodiment of the present invention, plural (i.e., four) ring-shaped fins 32 are fixed on the outer peripheral wall of the metal casing 2.

Figure 3:
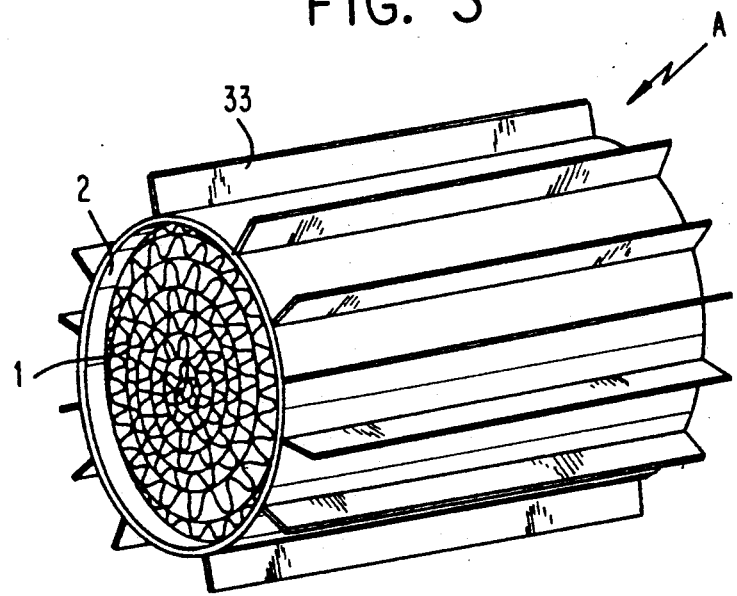
FIG. 3 is a perspective view of an exhaust gas cleaning device according to a third embodiment of the present invention, in which a further finned metal casing is used.

(iii) In FIG. 3 illustrating the third embodiment of the present invention, plural (12) elongated straight fins 33 are fixed in parallel with a central axis of the internal honeycomb core body and at predetermined angular intervals on the outer peripheral wall of the metal casing 2.

Figure 4:
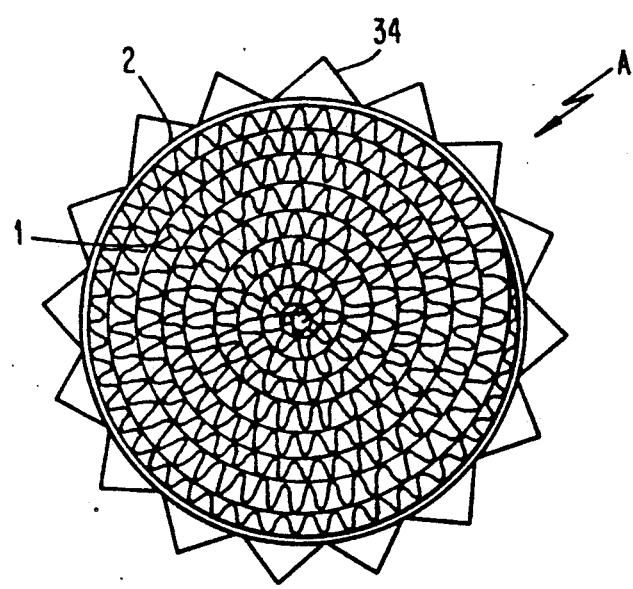
FIG. 4 is an end view of an exhaust gas cleaning device according to a fourth embodiment of the present invention, as viewed in the direction of a longitudinal central axis of the finned honeycomb core body, in which a still further finned metal casing is used.

(iv) In FIG. 4 directed to the fourth embodiment of the present invention, plural wavy fins 34 having a substantially sinuous cross-section are fixed at groove portions thereof on the outer peripheral wall of the metal casing 2.

These fin structures should be interpreted as merely illustrative. The present invention should therefore be interpreted to embrace all deformations of these shapes and combinations of parts of two or more of these shapes, which may be contemplated of by an artisan on the basis of the present invention.

For example, in FIGS. 1 through 3, each fin may be formed into a wavy or sinuous form. In this modification, the rigidity and heat radiation can be improved further. In FIG. 3, each fin may have such a length that both axial ends of the fin are indented from the corresponding axial ends of the metal casing 1. In addition, in FIGS. 1 through 3, each fin may be bent at a root portion thereof into an L-shape as viewed in a transverse cross-section. This modification makes it possible to firmly fix each fin on the outer peripheral wall of the corresponding metal casing 2.

We claim:

1. In an exhaust gas cleaning device constructed of a metal casing open at both ends thereof and a honeycomb core body fixedly enclosed within the metal casing, said honeycomb core body having been formed by superposing a planar band of a metal sheet and a corrugated band made from another metal sheet one over the other in a contiguous relationship, defining a number of network-patterned axial gas flow passages and carrying an exhaust gas cleaning catalyst, the improvement comprising providing at least one fin fixed on an outer peripheral wall of the metal casing and extending perpendicularly outward from said outer peripheral wall, which at least one fin improves the rigidity of the structure of the exhaust gas cleaning device.

2. The exhaust gas cleaning device of claim 1, wherein the honeycomb core body has been formed by superposing the planar band and corrugated band one over the other in a contiguous relationship and then rolling the thus-superposed bands into a multi-layered spiral form.

3. The exhaust gas cleaning device of claim 1, wherein the honeycomb core body has been formed by superposing the planar band and corrugated band into a multi-layered composite body.

4. The exhaust gas cleaning device of claim 1, wherein said at least one fin comprises a spiral fin fixed on the outer peripheral wall of the metal casing.

5. The exhaust gas cleaning device of claim 1, wherein said at least one fin comprises at least one ring-shaped fin fixed on the outer peripheral wall of the metal casing.

6. The exhaust gas cleaning device of claim 1, wherein said at least one fin comprises plural elongated fins fixed in parallel with a central axis of the metal casing and at predetermined angular intervals on the outer peripheral wall of the metal casing.

7. The exhaust gas cleaning device of claim 1, wherein said at least one fin comprises at least one wavy fin having substantially a sinuous cross-section fixed at groove portions thereof on the outer peripheral wall of the metal casing.

8. The exhaust gas cleaning device of claim 1, wherein the metal casing has a circular transverse cross-section.

9. The exhaust gas cleaning device of claim 1, wherein the metal casing has an oval transverse cross-section.

* * * * *